No. 774,266.

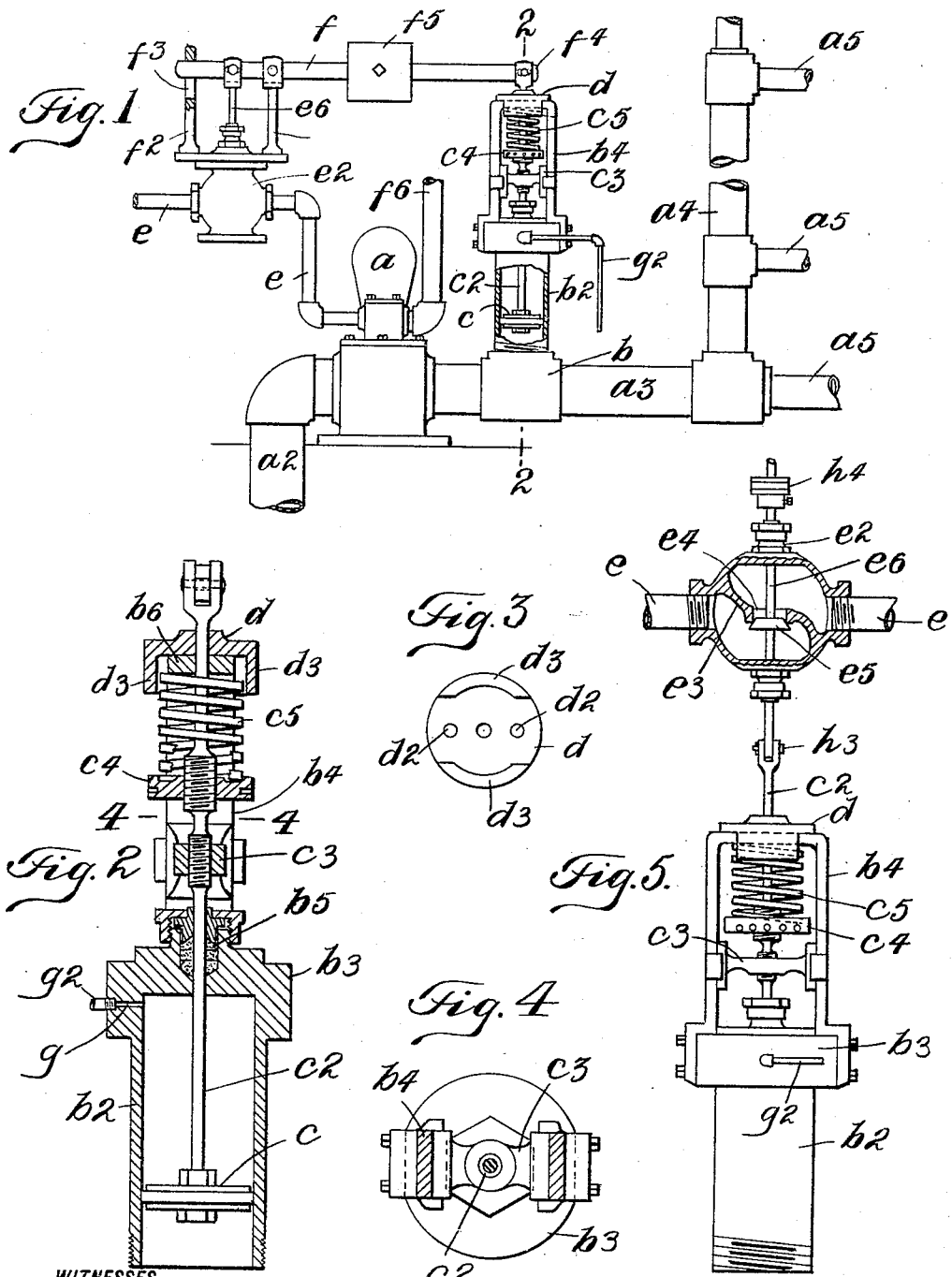

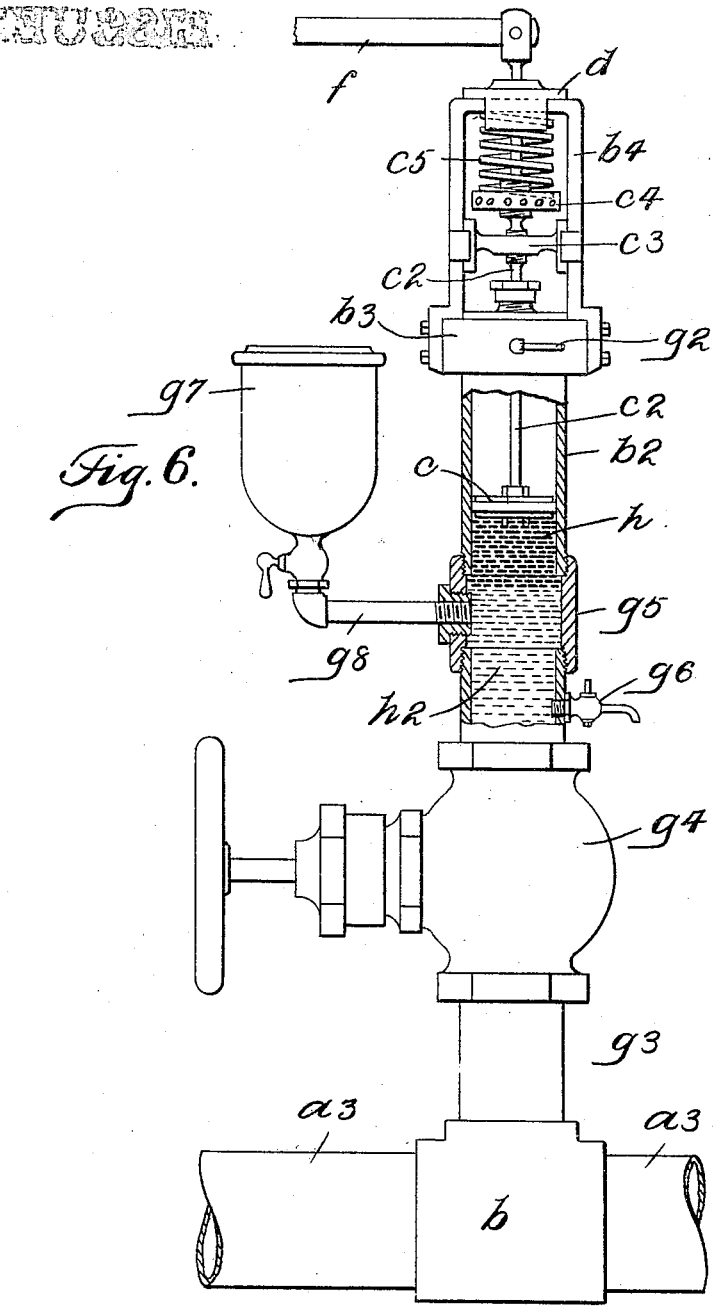

Patented November 8, 1904.

UNITED STATES PATENT OFFICE.

REISSUED

CHARLES P. McMULLEN, OF BROOKLYN, NEW YORK.

GOVERNOR FOR PUMPING-ENGINES.

SPECIFICATION forming part of Letters Patent No. 774,266, dated November 8, 1904.

Application filed July 12, 1904. Serial No. 216,216. (No model.)

*To all whom it may concern:*

Be it known that I, CHARLES P. MCMULLEN, a citizen of the United States, residing at Brooklyn, in the county of Kings and State of New York, have invented certain new and useful Improvements in Governors for Pumping-Engines, of which the following is a specification, such as will enable those skilled in the art to which it appertains to make and use the same.

The object of this invention is to provide an improved governor for use in connection with pumping-engines, a further object being to provide an improved governor for pumping-engines which are used in buildings, steamers, and other vessels for pumping water into and through stand-pipes and other connections, a further object being to provide a governor for pumping-engines which may be used in connection with such engines wherever operated; and with these and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 1 is a sectional side view of a pumping-engine and its connections provided with my improved governor; Fig. 2, a section on the line 2 2 of Fig. 1; Fig. 3, a bottom plan view of a detail of the construction shown in Figs. 1 and 2; Fig. 4, a section on the line 4 4 of Fig. 2; Fig. 5, a sectional side elevation showing a modification of the construction shown in Fig. 1, and Fig. 6 a sectional side elevation of a part of the construction shown in Fig. 1 and showing an oiling device connected therewith.

In the drawings forming part of this specification I have shown at $a$ an ordinary pumping-engine, with which is connected a water-supply pipe $a^2$, this connection being made in the ordinary manner, and connected with the pump $a$, opposite the connection of the water-supply pipe $a^2$, is a lead-pipe $a^3$, by means of which water is conveyed from the pump $a$ to a stand-pipe $a^4$, having branch connections $a^5$, with which in practice ordinary hose may be connected in the usual manner.

In the practice of my invention I connect with the lead-pipe $a^3$ a three-way coupling $b$, with which is connected a piston-cylinder $b^2$, having a head member $b^3$, with which is connected a yoke-shaped frame $b^4$, and placed in the cylinder $b^2$ is a piston $c$, having a rod $c^2$, which passes upwardly through the head $b^3$ of the cylinder $b^2$ and through a stuffing-box $b^5$, with which said head is provided, and through the head $b^6$ of the yoke-shaped frame $b^4$. The piston-rod $c^2$ also passes through a vertically-movable cross-head $c^3$, mounted in the yoke-shaped frame $b^4$, and the rod $c^2$ where it is passed through the cross-head $c^3$ is screw-threaded, and by means of this construction the position of said cross-head on said rod may be regulated or adjusted vertically. The rod $c^2$ is also provided above the cross-head $c^3$ with a nut $c^4$, between which and the head $b^6$ of the yoke-shaped frame $b^4$ is placed a spring $c^5$, and the nut $c^4$ is vertically adjustable on the rod $c^2$, and by means of this construction the tension of the spring $c^5$ may be regulated. Mounted on the cross-head $b^6$ of the yoke-shaped frame $b^4$ is a cap $d$, which is secured to the cross-head $b^6$ by means of screws or bolts passed through holes $d^2$, and said cap is provided with side flanges $d^3$, which hold the spring $c^5$ in proper position. A bottom plan view of the cap $d$ is given in Fig. 3, and a plan of the cross-head $c^3$ and section of the yoke-shaped frame $b^4$ is given in Fig. 4.

Connected with the pump $a$ is a steam-supply pipe $e$, which may receive steam from any suitable source, and placed in this pipe is a throttle-valve $e^2$ of the ordinary construction and similar to that shown in Fig. 5, and said throttle-valve comprises a casing having a partition $e^3$, provided with a port or passage $e^4$, controlled by a valve $e^5$, connected with a valve-rod $e^6$, passing vertically through the valve-casing, and in the form of construction shown in Fig. 1 the throttle-valve is operated by the rod $e^6$, the upper end of which is connected with a lever $f$. The valve or valve-casing $e^2$ is provided at its opposite sides with supports $f^2$, to one of which the lever $f$ is pivoted, and the shorter end of the lever $f$ is movable in a vertical slot $f^3$, formed in the other support $f^2$, and the longer end of said lever is connected with the upper end of the piston-rod $c^2$, as shown at $f^4$, and said lever is also provided with an adjustable weight $f^5$.

The pump $a$ is provided with an exhaust-pipe $f^6$, and the operation of this construction, as shown in Figs. 1 to 4, inclusive, is as follows: It will be understood that the tension of the spring $c^5$ may be regulated to any desired extent, and the weight $f^2$ may also be adjusted so as to aid in regulating the pressure on the piston-rod $c^2$, and when the pump $a$ is put in operation the water will be forced through the lead-pipe $a^3$ into the stand-pipe $a^4$ and into the branch pipes $a^5$ in the usual manner. If at any time the pressure in the pipe $a^3$ reaches or exceeds a predetermined amount, the piston $c$ will be operated and the throttle-valve $e^2$ will be closed and the steam-supply to the pump will be cut off, and this action, as will be understood, is automatic at all times. As soon as the pressure in the pipe $a^3$ is lowered beyond the said predetermined point the operation of the piston $c$ will be reversed and the steam will again pass through the throttle-valve $e^2$, and the operation of the pump will be renewed. It will also be apparent that the flow of water from one or more of the branch pipes $a^5$ will lessen the pressure in the pipe $a^3$ and the pump $a$ will be operated with greater force, and the closing of one or more of the pipes $a^5$ will reverse this operation, the pressure in the pipe $a^3$ will be increased, and the piston $c$ will be operated and the supply of steam to the pump will be cut off and the operation of the pump is thus made automatic.

The head $b^3$ of the cylinder $b^2$ is provided with a by-pass $g$, having a drain-pipe $g^2$, the object of which is to allow any water that may pass around the piston $c$ and collect in the upper end of the cylinder $b^2$ to flow out or drain out, and thus be prevented from being forced through the stuffing-box $b^5$.

In Fig. 6 I have shown a modification, or rather a means, for oiling the cylinder $b^2$, which is particularly designed for use in cases where salt water is pumped through the pipes $a^3$, $a^4$, and $a^5$, and for this purpose I connect with the three-way coupling $b$ a supplemental pipe $g^3$, with which the cylinder $b^2$ is connected, and the pipe $g^3$ is provided with a cut-off valve $g^4$. The cylinder $b^2$ is connected with the supplemental pipe $g^3$ by means of an intermediate coupling member $g^5$, below which is a drain-faucet $g^6$, and connected with the intermediate coupling member $g^5$ is an oil-cup $g^7$, this connection being made by means of a pipe $g^8$, and in practice whenever it is desired to oil the cylinder $b^2$ or the piston $c$ the valve $g^4$ is closed and any water in the cylinder $b^2$ is allowed to drain off through the drain-faucet $g^6$. Oil is then allowed to flow into the coupling member $g^5$ and cylinder $b^2$, and in Fig. 6 this oil is shown at $h^2$ as resting on the water $h^3$, and in this way the cylinder $b^2$ and the piston $c$ may be thoroughly lubricated at any and all times or whenever necessary.

In Fig. 5 I have shown a modification of the construction shown in Fig. 1, in which the throttle-valve $e^2$ is placed directly over the cylinder $b^2$ and the valve-rod $e^6$ is connected directly with the upper end of the piston-rod $c^2$, as shown at $h^3$, and in this form of construction the valve-rod $e^6$ passes vertically through the casing of the throttle-valve and is vertically movable therein, and the upper end thereof is provided with a plurality of weights $h^4$. In this form of construction the spring $c^5$ operates in the same manner as with the construction shown in Fig. 1, and the weights $h^4$ take the place of the weight $f^5$, and the pressure of water necessary to operate the piston $c$ may thus be regulated.

Although I have described my governor as particularly applicable to engines for pumping water through stand-pipes and other connections in buildings, steamers, and other vessels, it will be apparent that the same may be used in connection with pumping-engines of any kind or class and wherever employed or for whatever purpose, and I reserve the right to make all such alterations therein and modifications thereof as fairly come within the scope of the invention.

Having fully described my invention, what I claim as new, and desire to secure by Letters Patent, is—

1. In an apparatus of the class described, a lead-pipe, a coupling connected therewith and provided with a cut-off valve, a cylinder connected with said coupling, a piston mounted in said cylinder and provided with a rod which passes out through one end thereof, a yoke-shaped frame connected with the end of the cylinder through which said rod passes, pressure devices mounted in said frame and operating in connection with said rod and means for oiling said cylinder, substantially as shown and described.

2. In an apparatus of the class described, a lead-pipe, a coupling connected therewith and provided with a cut-off valve, a cylinder connected with said coupling, a piston mounted in said cylinder and provided with a rod which passes out through one end thereof, a yoke-shaped frame connected with the end of the cylinder through which said rod passes, pressure devices mounted in said frame and operating in connection with said rod and means for oiling said cylinder comprising an oil-cup connected with the end thereof opposite that through which the piston-rod passes, and a drain-faucet connected with said coupling adjacent to the cylinder.

In testimony that I claim the foregoing as my invention I have signed my name, in presence of the subscribing witnesses, this 9th day of July, 1904.

CHARLES P. McMULLEN.

Witnesses:
 F. A. STEWART,
 C. J. KLEIN.